July 18, 1944. G. C. STAATS 2,353,940
DETACHABLE LINK
Filed May 14, 1943
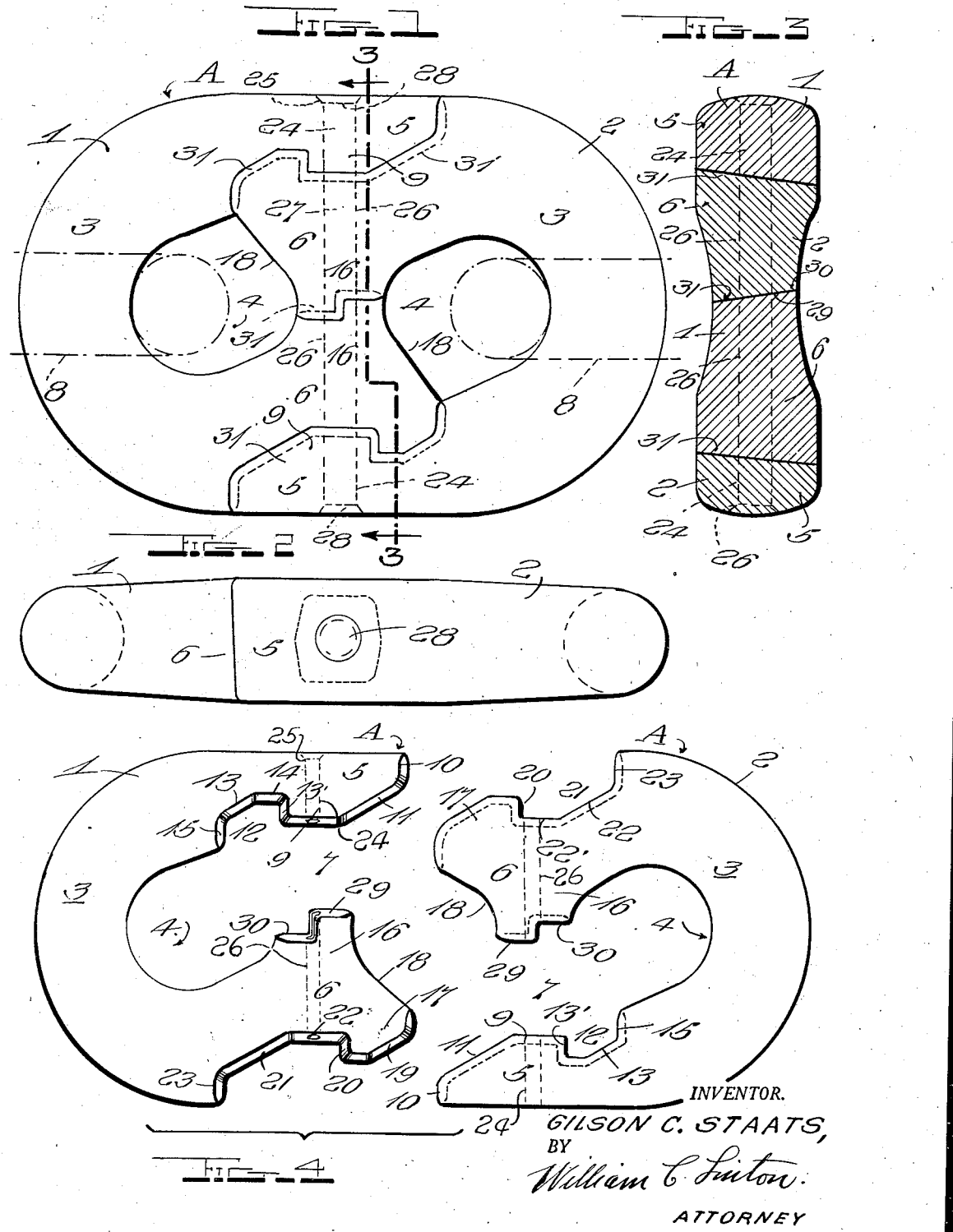
INVENTOR.
GILSON C. STAATS,
BY
William C. Linton
ATTORNEY Patented July 18, 1944

2,353,940

UNITED STATES PATENT OFFICE 2,353,940

DETACHABLE LINK

Gilson C. Staats, Chester, Pa., assignor to himself and N. D. Powell, New York, N. Y.

Application May 14, 1943, Serial No. 487,029

4 Claims. (Cl. 59—85)

This invention relates to improvements in separable and detachable links or shackles, and particularly to links or shackles of that type disclosed in my prior application filed March 13, 1943, Ser. No. 479,125, allowed May 18, 1944, and comprising a pair of members or sections having interlocking engagement with each other and held assembled by fastening means normally uniting them in a firm and secure manner, but adapting them to be separated when required for the substitution of a new link member or other part for a completely worn out one, or the disconnection of the elements joined by the link or shackle.

The invention provides a link or shackle formed of substantially duplicate sections, and, therefore, adapted to be economically made, which sections are provided with inter engaging portions adapting them to be readily assembled and disassembled by relative lateral movements thereof, and when assembled to be held against separation by relative longitudinal movements thereof, and which sections are adapted to be held assembled and against lateral separating movement by a fastening pin or the like which, while normally holding them securely against separation, may be removed when it is desired to disconnect the sections.

In the construction shown in my aforesaid application each link member is provided with a pair of locking arms which in the assembly constitute outer and inner or male and female coupling arms, the inner arm of each member being overlapped by the outer arm of the other member. The outer faces of the inner arms and inner faces of the outer arms of these members are provided with tongues and recesses to interlock with each other and hold the members from longitudinal separation or separation other than by prescribed relative lateral movements thereof, while the inner portions of the inner arms are formed with bosses which abut and in the shackle assembly close the throat between the link receiving eyes of the shackle. Registering openings extending through the arms and their bosses are provided for the passage of a fastening pin, rivet or bolt whereby the members are held from separating movement. The arms interlock on zigzag lines so that a high resistance to relative longitudinal movements between the sections is afforded, but as the center bosses are not interlocked slight movements in course of time may occur causing in time wear upon and a tendency to loosening of the parts and bending strains being thrown upon the fastening pin, rivet or bolt.

One object of the present invention is to provide an improved construction which overcomes this objection, and another object of the invention is to provide a tapering formation of the interfitting portions whereby a still firmer connection between the shackle members is secured and twisting strains prevented from falling upon the fastening pin.

With these and other objects in view, the invention consists in certain novel features of construction, combination and arrangement of parts, hereinafter fully described and claimed, and as shown in the accompanying drawing, in which:

Fig. 1 is a view in side elevation of a detachable link or shackle embodying my invention, and showing the parts as united for use.

Fig. 2 is a plan view of the link or shackle.

Fig. 3 is a transverse section thereof on the line 3—3 of Fig. 1.

Fig. 4 is a side elevation of the link or shackle and showing the sections thereof separated from each other.

Referring now more particularly to the drawing, the link or shackle A is of transversely divided type and comprises a pair of substantially U-shaped duplicate sections, halves or members 1 and 2, each consisting of a body portion 3 formed with a receiving eye or opening 4 and with a pair of inwardly projecting arms 5 and 6. The arms 5 and 6 are arranged substantially in parallel relation and spaced to provide a throat or passage 7 communicating with the eye or opening 4. When the members 1 and 2 are disconnected the throat 7 admits of the introduction into the eye 4 of either member of the detachable link of the end of a chain link or other element 8, as shown in dotted lines in Fig. 1, with which the detachable link is to be connected, or of the withdrawal from the eye 4 of an element 8 which has been connected to the detachable link. The link A may form a coupling connection between two such link elements 8 of a chain, in which case the members 1 and 2 are engaged with the adjacent ends of adjoining link elements of the chain, or the detachable link may be used to couple the link element of one end of a chain to anything to which it is to be fastened, or the detachable link may be employed to serve the function of a shackle and for many other similar purposes.

The arms 5 and 6 of each member differ in construction, but the corresponding arms of the two members are similar in construction to each other. Each member 1 and 2 is a substantial duplicate of the other, but in use they are employed as rights and lefts, or with their arms 5 and 6 in reverse order, so that the arm 5 of each member coacts interengagingly with the arm 6 of the other member. For the purpose of distinguishing these arms the arm 5 may be termed an outer or male coupling arm and the arm 6 with which it coacts an inner or female coupling arm. These arms are of novel and peculiar construction, as will now be more fully described.

As shown, the arm 5 of each member is arranged in alinement with the end of the body 3 from which it projects, while the arm 6 of each member is arranged to lie in a plane offset inwardly from the opposite end of the body 3 from which it projects. The arrangement is thus such that when the members 1 and 2 are assembled the arm 5 of each member will overlap and lie outside the arm 6 of the other member and so that the arm 6 of each member will be received in the throat or passage between the arms 5 and 6 of the other member and close said throat or passage. When so arranged all the arms will be disposed in lapping order to form a link or shackle having an eye at each end closed against communication with the other eye by the intervening portions of the lapping arms.

The arm 5 of each member is provided with a central inwardly extending boss 9 and with an end tongue 10 having a beveled or inner surface 11. On its inner side the arm 5 is also provided with a recess 12 lying between the boss 9 and adjacent end of the body 3 and formed with a beveled wall 13, a short straight wall 13' and outer or inner end walls or shoulders 14 and 15. The arm 6 of each member is provided with a central boss 16 and with an end tongue 17, said boss and tongue having an inner curved face 18 and said tongue being otherwise of a shape conforming to and adapted to snugly fit the recess 12 in the arm 5 of the other member, said tongue being adapted to abut at its end against the shoulder 15 of the recess 12 and having a beveled face 19 and a shoulder 20 to engage the wall 13 and shoulder 14 of the recess 12. The arm 6 of each member is also formed in its outer side with a recess 21 similar in form to the recess 12, but of greater length and having a beveled wall 22, straight wall 22', an inner end shoulder 23 and an outer end shoulder formed by the tongue shoulder 20. Through the body portions and bosses of the arms 5 extend openings 24, countersunk at their outer ends, as shown at 25, and through the body portions and bosses of the arms 6 extend openings 26 which, when the members are assembled, register with each other centrally of the link or shackle, as shown in Figs. 1, 2 and 5.

The above described forms of the arms provide a construction of interengaging surfaces adapting the members to be engaged and disengaged by relative lateral movements and to be held or physically interlocked against relative longitudinal movements. To hold the members when engaged, as in service, against relative lateral movements and separation, suitable means engageable with the openings 24 and 26 is provided. In the present instance the means employed comprises a fastening pin 27 which extends through the openings and has its ends riveted, as shown at 28, the riveted ends lying flush with the adjacent surfaces of the link members in the countersinks 25. When this pin is applied, the members 1 and 2, which are held by the arms against longitudinal displacement, are held by the pin against lateral displacement and separation. In the event, however, that it is desired to open the link for separation from a part or parts to which it is applied, this may be readily effected by cutting away one of the riveted ends, whereupon the pin may be removed and the link members separated. In a similar manner the link members may be separated whenever it is desired to substitute a new link member for a broken or unduly worn one. In either case the link members may be again fastened together by the use of a new pin.

It will be observed that the link members when engaged are coupled in a zigzag line by their arms, the engaging portions of which hold them from longitudinal movement in either direction and also from lateral pivotal movement on the pin as an axis, and, as long as the pin is in fastening position, no movement of the link members in a lateral direction can occur. Also, it will be observed that when the link members are united both eyes 4 are closed at their inner ends by the bosses of the engaged arms and, as all of the arms are in lapping engagement and fastened together at the center of the link, a link of maximum strength to resist strains in all directions is produced and one presenting a large extent of surface for wear, so that great durability of the link in service is insured.

In assembling the members 1 and 2, they are brought side by side so that the tongues 10 of arms 5 and tongues 17 of arms 6 will register with the recesses 12 and 21 and so that the central portions and bosses of arms 6 will aline with the throats 7, whereupon by relative lateral movement toward each other the members may be engaged, as shown in Figs. 1, 2 and 3. The tongues and recesses will then be in engagement and the apertured bosses in alinement so that upon the application of the fastening pin the members will be united against separating movement. When the pin is removed for any of the purposes before stated the links may be disconnected by moving them laterally apart. As before stated, as long as the pin is in place the link members will be held firmly united, but by merely cutting away one of the riveted ends 28 the link members may be separated in a ready, quick and convenient manner. The construction avoids the use of threaded parts, nuts or other like fastenings liable to become loose or lost or to become rusted or "frozen" and difficult to remove when it is desired to separate the link members.

In accordance with the present invention, the bosses 16 of the tongues 6 are provided each with a tongue 29 and a recess 30 arranged one in rear of the other with respect to the axial center of the boss. When the members are coupled the tongue 29 of the member 1 engages the recess 30 of the member 2, and vice versa, so that the central throat closing bosses are interlocked on a zigzag line together at each side of the transverse center of the link and at opposite sides of the fastening pin, whereby relative longitudinal movements of the parts at this point will be prevented, wear on the link reduced and tensile strains falling on the link removed from the fastening pin. Any tendency to movements causing bending of the pin will thus be obviated.

Also, in accordance with the present invention, the engaging surfaces of the interlocking parts of the link members are also preferably beveled transversely, as shown at 31, for lateral engagement with a wedging fit, thus increasing the strength and rigidity of the link and reducing to the minimum any tendency of the link or pin to become bent or distorted by twisting strains.

From the foregoing description, taken in connection with the drawing, the construction, mode of use and advantages of my improved detachable link will be readily understood and appreciated by those versed in the art without a further and extended description. While the structures shown are preferred, it will, of course, be understood that changes in the form, construction, arrangement and proportions of the parts, falling within the scope of the appended claims, may be made without departing from the spirit or sacrificing any of the advantages of the invention.

Having thus described my invention, I claim:

1. A detachable link or shackle comprising a pair of transversely divided substantially U-shaped members having the free ends of their arms provided with interengaging portions adapting the members to be engaged and disengaged by relative lateral movements thereof and when engaged to be held against relative longitudinal movements, and said ends of the arms of said members having bosses extending inwardly therefrom and closing the throats between the arms of the members when engaged, said bosses being provided with interengaging portions, and means for connecting said members and holding them from separation.

2. A detachable link or shackle comprising a pair of transversely divided substantially U-shaped members having the free ends of their arms provided with interengaging portions adapting the members to be engaged and disengaged by relative lateral movements thereof and when engaged to be held against relative longitudinal movements, and said ends of the arms having bosses extending inwardly therefrom and closing the throats between the arms of the members when engaged, said bosses being provided with interengaging portions, and a pin passing through the members and holding them from separation.

3. A detachable link of shackle comprising a pair of transversely divided substantially U-shaped members having the free ends of their arms provided with interengaging portions adapting the members to be engaged and disengaged by relative lateral movements thereof and when engaged to be held against relative longitudinal movements, and said ends of the arms having bosses extending inwardly therefrom and closing the throats between the arms of the members when engaged, said bosses being provided with interengaging portions, and means for connecting the members and holding them from separation, said engaging portions of the members being tapered for a wedging engagement thereof.

4. A detachable link or shackle comprising a pair of members each having an eye and a pair of inwardly extending arms spaced to form a throat communicating with the eye, the arms of the members being arranged to overlap with one arm of each member having a central boss fitting within the throat of the other member when the members are in engagement, said arms being provided with interengaging portions adapting the members to be engaged and disengaged by relative lateral movements thereof and when engaged to be held against relative longitudinal movements and each of said bosses having a tongue and a recess, the tongue of each boss engaging the recess in the other boss, and means for connecting said members and holding them from separation.

GILSON C. STAATS.